W. LIPPITZ.
APPARATUS FOR PLANTING POTATOES AND THE LIKE.
APPLICATION FILED SEPT. 4, 1919.

1,415,937.

Patented May 16, 1922.
3 SHEETS—SHEET 1.

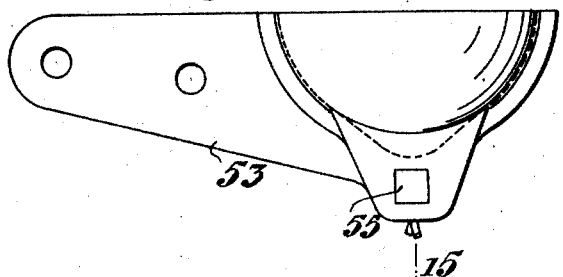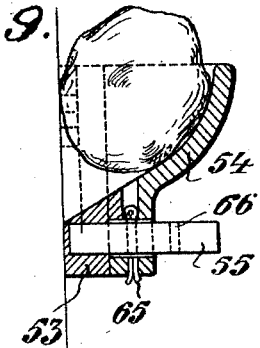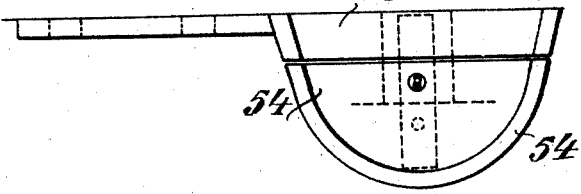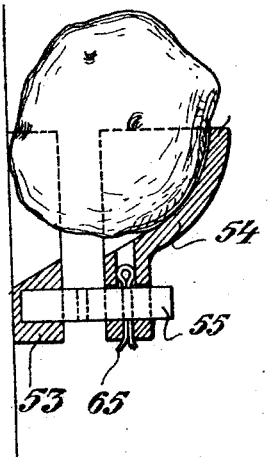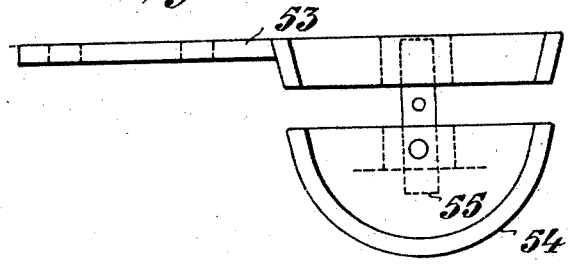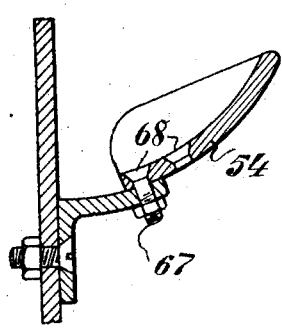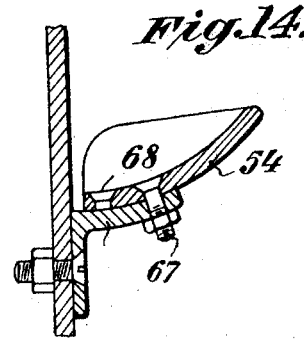

UNITED STATES PATENT OFFICE.

WILHELM LIPPITZ, OF JAUER, GERMANY.

APPARATUS FOR PLANTING POTATOES AND THE LIKE.

1,415,937.  Specification of Letters Patent.  Patented May 16, 1922.

Application filed September 4, 1919. Serial No. 321,645.

*To all whom it may concern:*

Be it known that I, WILHELM LIPPITZ, a citizen of Germany, residing at Jauer, in Schlesien, in the State of Prussia, Germany, have invented certain new and useful Improvements in Apparatus for Planting Potatoes and the like; and I do hereby declare the following to be a full, clear, and exact description of the invention, such as will enable others skilled in the art to which it appertains to make and use the same.

This invention relates to that class of potato-planting machines in which the potatoes are dropped on the soil by means of a revolving drum, means being provided for picking up the potatoes from a suitable hopper and delivering them through the side of the drum into an annular series of chambers within the drum.

Figure 1:
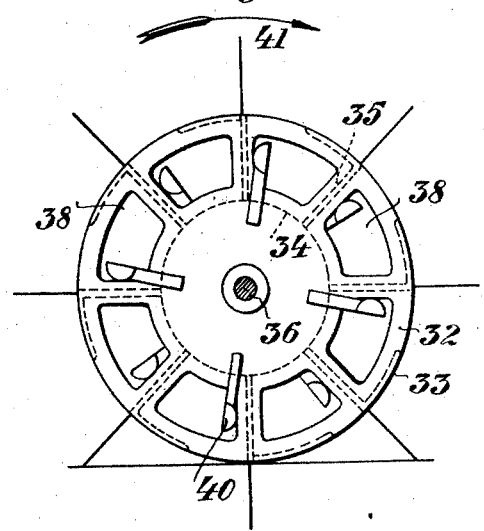
Figure 2:
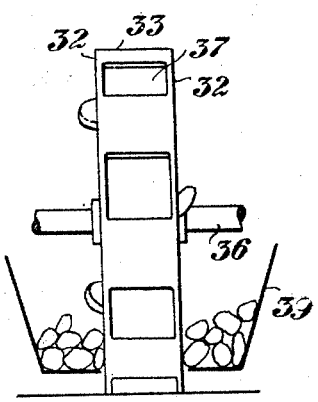
Figure 3:
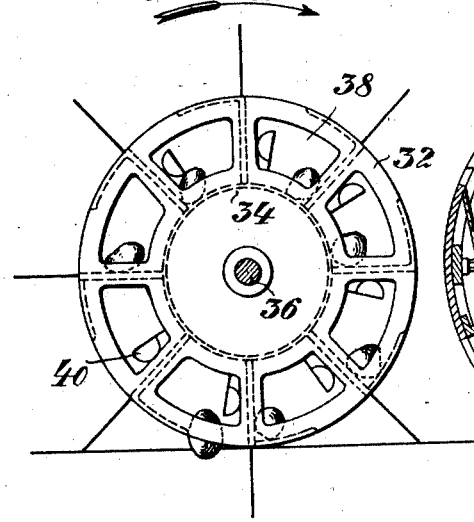
Figure 4:
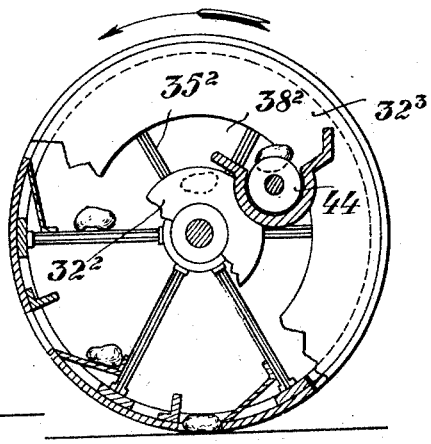
Figure 5:
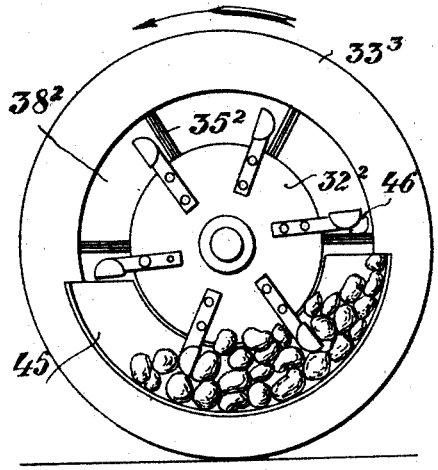
Figure 6:
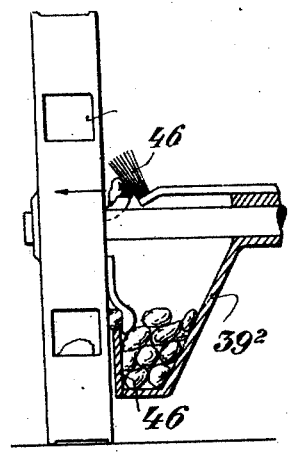
Figure 7:
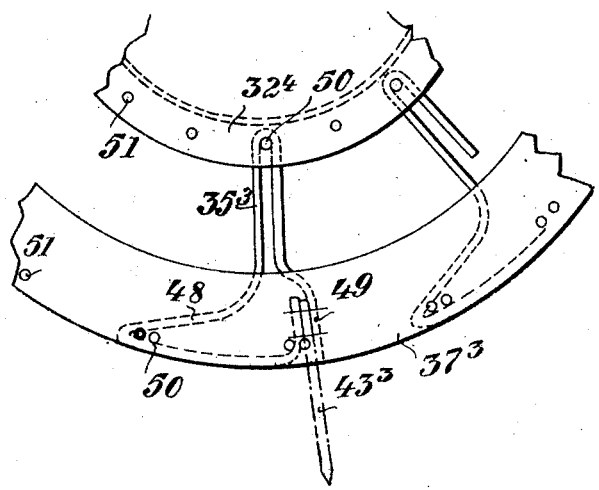

The preferred construction is illustrated in the accompanying drawing, in which:

Fig. 1, is a side view of the dropping drum provided at its sides with scoops for picking out potatoes and about its circumference with spades, Fig. 2, is a front view partly in section of the drum shown in Fig. 1, the spades being omitted, Fig. 3, is a side view similar to that illustrated in Fig. 1, and showing a modification of the dropping drum in which the picking out scoops are provided at one side of the drum, Fig. 4 is a side view partly in section showing a modification of the dropping drum and the means for supplying the potatoes thereto, Fig. 5, is a similar side view showing a further modification of the drum, Fig. 6, is an end view of Fig. 5 partly in section and seen in the direction of the travel of the planter, Fig. 7, is an enlarged detail view of the drum, Fig. 8, is a front view showing a modification of the picking out scoops, Fig. 9, is a cross-section taken on the line 15—15 of Fig. 8, Fig. 10, is a plan view of Fig. 8 showing the scoop in position for picking out potatoes of small size, Figs. 11 and 12, are respectively a plan view and a section showing the parts of the scoop in the position for picking out potatoes of larger size, Fig. 13, is a cross-section of the scoop showing a modification of the means for setting the parts of the scoop in position for picking out potatoes of different sizes, and Fig. 14, is a similar section showing the parts in the position for receiving potatoes of small size.

To enable the operator to examine the proper function of the dropping drum 4 and the means for supplying the potatoes thereto I prefer to provide a dropping drum of the construction shown by way of example in Figs. 1 to 3. As shown in the said figures the drum consists of two outer circular disks 32, concentric cylindrical walls 33 and 34, and substantially radial partitions 35 by means of which the annular space provided between the cylinders 33 and 34 is divided into several chambers. The outer cylinder 33 is formed with holes 37 one for each of the chambers provided between successive partitions 35, and the said plates 32 are provided with apertures 38 through which the driver can inspect the inner part of the chambers of the drum. As appears more particularly from Figs. 1 and 3 the holes 37 are disposed in the direction of the rotation of the drum at the rear part of each chamber of the drum. In the example shown in Fig. 2 the potatoes are supplied to the drum from receptacles 39 one of which is provided at each side of the drum. In Fig. 1 these receptacles have been omitted. Laterally of the drum 4 means are provided for picking out individual potatoes from the receptacles 39, and as shown in Fig. 1 such means consist of revolving scoops 40 one for each of the chambers of the drum. As the drum and the scoops 40 rotate in the direction of the arrow 41 shown in Figs. 1 and 3, each scoop picks out one potato and pushes the same through the cooperating aperture 38 and into the cooperating chamber. Upon further rotation of the drum the potato moves successively over the outer surface of the cylinder 34, the rear face of the radial partition 35 and on the part of the cylinder 33 which extends rearwards from the said partition. When the chamber has passed the lowermost position the potato is dropped from the cylinder 33 and through the opening 37 as is indicated in Fig. 3. In such cases in which receptacles 39 are provided on opposite sides of the drum I prefer to dispose the scoops 40 alternately on opposite sides of the drum, as appears from Fig. 1.

Where the planter is provided with three dropping drums the one that is located in the middle is likewise constructed in the manner shown in Figs. 1 and 2. The outer drums are preferably constructed in the manner shown in Fig. 3 in which one receptacle 39 is provided and in which all the scoops are provided at the same side of the drum. However in such cases I prefer to provide apertures 38 in both side faces of the drum.

It will readily be understood, that by reason of the construction shown in Figs. 1 to 3 the operator is able to examine the proper supply of the potatoes from the receptable 39 to the chambers of the drum 4.

In Figs. 4 to 6 I have illustrated more in detail the manner in which the potatoes are preferably supplied to the distributing chambers of the drum. As shown in the said figures the side faces of the drum are constructed of two concentric disks $32^2$ and $32^3$ which are connected with each other by radial partitions $35^2$. By this construction an annular opening $38^2$ is provided between the disks $32^2$ and $32^3$ which has the same function as the apertures 38 shown in Figs. 1 to 3. The radial dimensions of the said annular space is such that potatoes of any size can be supplied therethrough to the distributing chambers. This construction of the aperture for the supply of potatoes to the drum is particularly useful in such cases in which the potatoes are supplied by means of a screw conveyer 44, as is shown in Fig. 4. I have found that in such cases in which the drum is provided with individual apertures 38 the screw conveyer which continuously supplies potatoes to the drum forces the said potatoes against the side face provided between successive apertures 38, whereby the potatoes are gradually piled up. By providing a continuous annular aperture 38 such piling up of potatoes is avoided. The same objection occurs in such cases in which the scoops are mounted independently of the drum and revolve at a higher speed than the latter. Therefore also in such cases the construction shown in Fig. 4 is particularly useful. In connection with the construction shown in Fig. 5 the receptacle $39^2$ is formed with an inner wall 45 which covers the lower part of the annular opening $38^2$ and prevents the potatoes piled up within the receptacle $39^2$ from falling into the distributing chambers as the latter pass through their lower-most positions, and the potatoes which are carried upwards by the scoops drop into the distributing chambers after the scoops have passed the upper edge of the side wall 45, as is shown in Fig. 11. In order that the potatoes may be thus dropped from the scoops into the distributing chambers the scoops are open at the sides which are adjacent to the drum. In some cases I prefer to provide a brush 46 above the upper edge of the side wall $39^2$ and in position for engaging the potatoes which are being carried upwards by the scoops and to shift the same from the scoops into the drum as is shown in Figs. 5 and 6.

In the foregoing I have described an example in which the scoops are secured to a side face or side faces of the drum. But I wish it to be understood that my invention is not limited to this feature and that in some cases the scoops are mounted on a separate rotary member which rotates either at the same speed as the drum or at a higher speed. In such cases in which the scoops revolve at a higher speed the annular aperture $38^2$ is particularly useful.

In those cases in which the same planter is to be used for planting potatoes of different sizes I prefer to construct the drum in such a way that the size of the distributing chambers and the discharge openings can easily be varied. Such a construction is shown by way of example in Fig. 7. As shown each radial partition wall $35^3$ is made integral with a guide shoe 48 projecting rearwards therefrom and with a front plate 49 which receives the potatoes supplied to the drum by the scoops or screw conveyer, and these parts are removably secured to the concentric plates $32^4$ and $32^5$ by means of screws 50, and I provide a large number of screw holes 51, so that any desired number of partitions $35^3$ can be disposed between the disks $32^4$ and $32^5$, whereby the sizes of the distributing chambers and the discharge openings $37^3$ thereof are varied at will. In combination with this construction the annular space $38^3$ provided between the disks $32^4$ and $32^5$ is particularly useful. In those cases in which the drum is provided with spikes or spades $43^3$ I prefer to secure the same to the removable members $35^3$.

In Figs. 8 to 14 I have shown an improved construction of the scoops by means of which potatoes of different sizes can be picked out by the scoops. My improved construction is preferable as compared to other constructions of this class in this respect, that it is particularly simple, that its weight is small, that it can be manufactured at low cost, and that it can be adapted to potatoes of any size. As shown in the said figures the scoops are constructed in sections which are adjustable relatively to each other. The scoop consists of a section 53 which is adapted to be secured to the dropping drum or the like, and of a section 54 which is adjustably secured to the section 53. In the example shown in Figs. 8 to 12 the section 54 is mounted on a bolt 55 of square cross-section secured to the section 53, and it is fixed in the desired position by means of a split pin 65 adapted to be passed through the wall of the section 54 and one of a plurality of bores 66 made in the bolt 55. In Figs. 8 to 11 I have shown the sections in the position for picking out potatoes of the smallest size. If it is desired to pick out potatoes of larger size the pin 65 is removed and the section 54 shifted outwards on the bolt 55 and fixed in the desired position by inserting the pin 65 through the proper bore 66.

While in describing this feature of the invention reference has been made to a single bolt 55 of square cross-section, it will be understood that my invention is not limited to this feature, and that instead of a single bolt a plurality of bolts may be made with circular cross-section. The reference to a bolt of square cross-section has been made merely for the purpose of explaining the invention. But even when using a single bolt 55 I do not limit myself to the particular cross-section referred to. Furthermore I do not limit myself to the particular form of the sections 53 and 54 of the scoop. For example instead of the solid section 54 one or more curved members in the form of fingers may be provided. In Figs. 13 and 14 I have shown a further example to show the manner in which the sections of the scoop may be connected with each other. As shown in the said figures the sections are shiftably placed with their ends one above the other and connected by one or more screws 67 each engaging either in one of several holes 68 or in a slot made in the section 54.

While in describing the invention reference has been made to several examples which according to different conditions answer the purpose best, I wish it to be understood that my invention is not limited to the constructions shown in the figures and that various changes may be made in the general arrangement of the apparatus and the construction of its parts without departing from my invention.

I claim:

1. In an apparatus for planting potatoes and the like, the combination with the dropping drum provided circumferentially with chambers for receiving and dropping the potatoes and provided in both its opposite side walls with openings permitting inspection of the chambers, of means located on opposite sides of said drum to alternately supply potatoes through said openings and to said chambers.

2. In an apparatus for planting potatoes and the like, the combination of a planting drum having openings in its side for receiving potatoes, a hopper alongside the drum, scoops adapted to dip into the hopper and deliver the potatoes into said drum, each of said scoops consisting of a member affixed to the drum, and another member adjustably affixed to the aforesaid member and inclining upwardly and outwardly, means being provided for adjusting this latter member inwardly and outwardly to thereby vary the capacity of the scoop.

3. In combination with a planting drum having openings in its side, scoops affixed thereto for picking up the potatoes and delivering them to said openings, each of said scoops consisting of two members, one being affixed to the side of the drum and having its upper face inclined downwardly and inwardly toward the drum and having a rigid part extending outwardly away from the drum, and said other member having its inner face curved upwardly and outwardly, means being provided whereby the latter member is adjustably mounted on said outwardly-extending part to thereby increase or decrease the capacity of the scoop.

4. In an apparatus for planting potatoes and the like, a dropping drum provided with partitions dividing the same into chambers and providing circumferential guide faces and openings through which the potatoes are dropped, and means to secure successive partitions at different distances from each other.

5. In an apparatus for planting potatoes and the like, a dropping drum provided with partitions dividing the same into chambers and providing circumferential guide faces, receiving faces, and openings through which the potatoes are dropped, and means to secure successive partitions at different distances from each other.

6. In an apparatus for planting potatoes and the like, the combination with the dropping member, of scoops for supplying the potatoes to said member, and constructed of a relatively fixed portion and a portion which is adjustable relatively to said fixed portion and has its potato engaging face inclined towards the fixed portion.

7. In an apparatus for planting potatoes and the like, a dropping drum having an annular aperture at least in one of its side faces and provided with partitions dividing the same into chambers and providing circumferential guide faces and openings through which the potatoes are dropped, means to secure successive partitions at different distances from each other, and means to supply potatoes through said annular aperture and into said chambers.

In testimony whereof I hereunto affix my signature in the presence of two witnesses.

WILHELM LIPPITZ.

Witnesses:
RICHARD KANOCHKE,
KARL KERKNART.